United States Patent [19]

Harmon et al.

[11] 3,743,182
[45] July 3, 1973

[54] TEMPERATURE SENSITIVE CONTROLS FOR AIR CONDITIONING SYSTEMS

[76] Inventors: Kermit S. Harmon, 428 Salem Drive, Richardson, Tex. 75080; Donal W. Loosley, 10512 Wyatt, Dallas, Tex. 75218

[22] Filed: Oct. 1, 1970

[21] Appl. No.: 77,056

[52] U.S. Cl. .................. 236/78, 236/49, 318/160
[51] Int. Cl. .................. G05b 11/06, G05d 23/24
[58] Field of Search .................. 236/78 C, 78 D, 75, 236/74, 49, 71, 72, 10; 307/310, 252 B; 318/227, 641, 46, 160, 159, 345

[56] References Cited
UNITED STATES PATENTS

| | | | |
|---|---|---|---|
| 3,395,885 | 8/1968 | Kolze et al. | 251/11 |
| 2,491,906 | 12/1949 | Ray | 318/160 X |
| 2,501,245 | 3/1950 | Waite | 318/160 X |
| 3,273,037 | 9/1966 | Winestock et al. | 318/160 X |
| 3,384,800 | 5/1968 | Norris et al. | 318/160 X |
| 3,404,835 | 10/1968 | Rodgers | 236/13 |
| 3,475,677 | 10/1969 | Swinehart et al. | 307/310 X |
| 3,495,777 | 2/1970 | Evalds et al. | 236/78 D |
| 3,489,345 | 1/1970 | Moreland | 236/78 X |
| 3,594,591 | 1/1969 | Laupman | 307/252 B |

Primary Examiner—William E. Wayner
Attorney—Richards, Harris & Hubbard

[57] ABSTRACT

The specification discloses a system for controlling the flow of various fluids in air conditioning systems. A sensor detects the ambient temperature of the area to be conditioned and circuitry responsive to the sensor provides electrical signals which vary in accordance with the ambient temperature. Various actuators are disclosed which are operable in dependence upon the electrical signals for modulating the flow of fluids in order to maintain the temperature of the area.

3 Claims, 10 Drawing Figures

Patented July 3, 1973
3,743,182
3 Sheets-Sheet 1
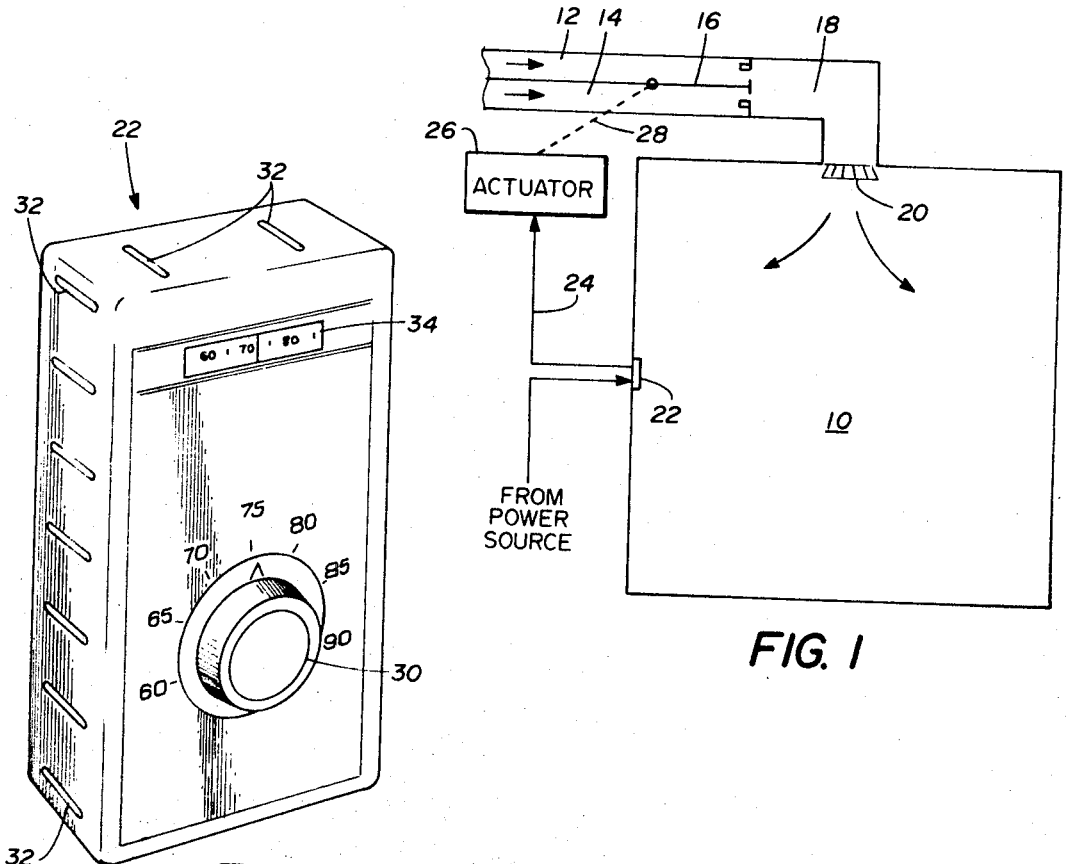
FIG. 1
FIG. 2
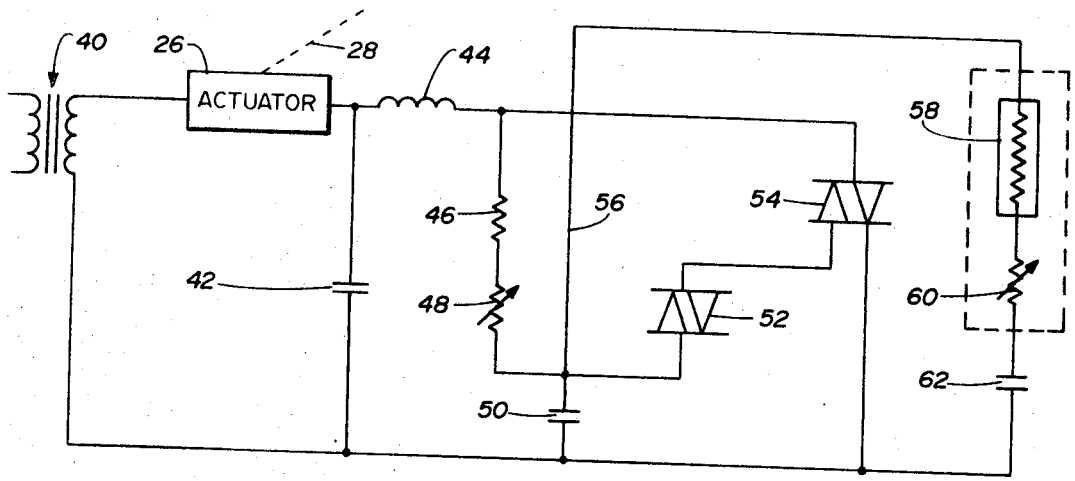
FIG. 3
INVENTORS:
KERMIT S. HARMON
DONAL W. LOOSLEY
Richards, Harris & Hubbard
ATTORNEYS Patented July 3, 1973
3,743,182
3 Sheets-Sheet 2
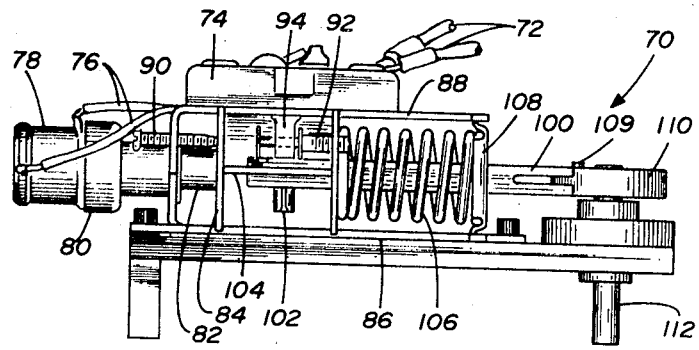
FIG. 4
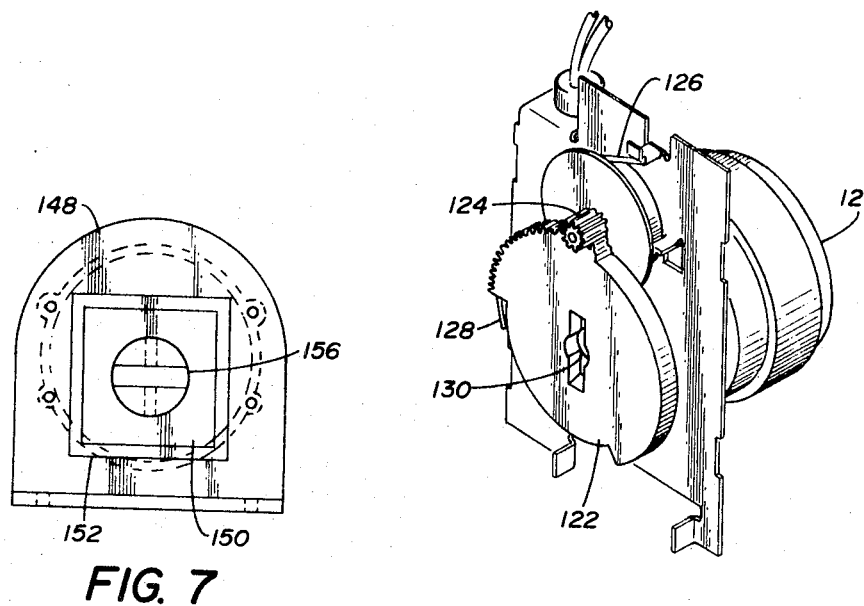
FIG. 5
FIG. 7
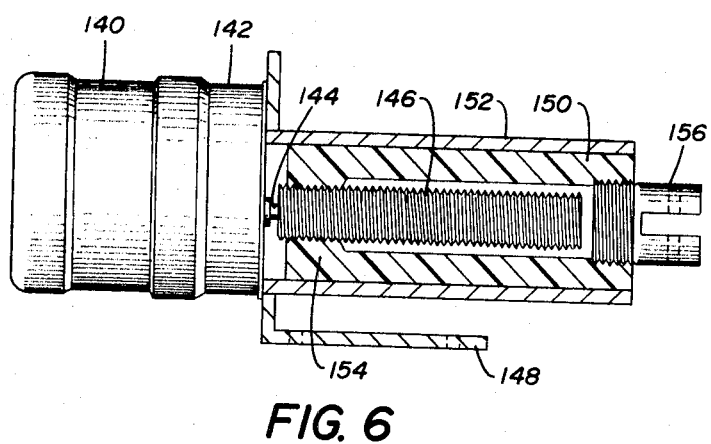
FIG. 6
INVENTORS:
KERMIT S. HARMON
DONAL W. LOOSLEY
Richards, Harris & Hubbard
ATTORNEYS

TEMPERATURE SENSITIVE CONTROLS FOR AIR CONDITIONING SYSTEMS

FIELD OF THE INVENTION

This invention relates to the control of fluid distribution systems employed in environmental control applications, and particularly relates to a temperature responsive system which modulates the position of dampers or other valves in air, water and other fluid distribution systems employed in air conditioning applications.

THE PRIOR ART

A large number of environmental control systems have previously been developed for automatic heating and cooling of areas. Many such control systems include dampers and other valves which are moved between fully opened and fully closed positions by temperature sensitive devices which vary only between "on" and "off" conditions. Such "on" or "off" control systems are typically used to vary the flow of conditioned air into an area, or to vary the amount of conditioned water or other fluids fed to the area. Due to the "on" or "off" operation of such prior systems, the humidity and effective air temperature in the conditioned areas often tend to continuously vary within a prescribed range, thereby continuously requiring power for operation of the system and often producing undesirable effects upon the environment of the area. Additionally, objectional erratic demand and flow characteristics often exist within the distribution system serving various terminals utilizing such "on" or "off" control systems.

Systems have also been heretofore proposed for modulating the position of valves and other dampers utilized in environmental control systems to eliminate certain of the disadvantages of "on" or "off" cycling controls. For example, servomechanism systems have been developed which include electrical bridges and mechanical follow-up devices to provide a modulating control arrangement in air conditioning systems. However, such systems have often not provided completely satisfactory operation, and have generally been relatively expensive and complex, thereby creating installation and maintenance problems. Other prior systems such as that disclosed in U.S. Pat. No. 2,576,246, issued to Taylor have also attempted to modulate valves, but such systems have generally utilized relatively crude sensing and control devices and have thus not been practical for commercial usage.

SUMMARY OF THE INVENTION

In accordance with the present invention, an environmental control system is provided which eliminates and circumvents many of the problems and difficulties present in previously developed systems. The present system utilizes a relatively low cost and simple temperature responsive control system which gradually modulates valves or other dampers in an environmental control system. Due to the modulation operation of the present system, radical variations in temperature and humidity, which have sometimes been caused by previously developed systems due to hunting and "on" or "off" operation, have been generally eliminated. The present system is adapted to be easily added onto existing environmental control systems and involves low electrical power requirements, while providing efficient and reliable performance.

In further accordance with the present invention, a system is provided for controlling the flow of a fluid in an environmental control system which includes a sensor for detecting the ambient temperature of the area to be controlled. Circuitry is operable in response to the sensor for generating electrical signals proportional to the detected ambient temperature. Structure is operable solely in dependence upon the electrical signals for modulation of a damper to control the mixture temperature of air to maintain the selected temperature of the area.

In accordance with another aspect of the invention, a system is provided to control a damper which regulates the mixture of warm air and cool air flowing into a zone. A sensor detects the air temperature within the zone. A power supply is operable in dependence upon the sensor to generate electrical signals representative of the sensed air temperature. An actuator is operable in response to the electrical signals for modulating the position of the damper to maintain the air temperature within the zone at or near a predetermined value.

In accordance with a more specific aspect of the invention, a system is provided for control of a valve in response to temperature variations. A sensor detects temperature and controls a power supply which generates an electrical signal representative of the sensed temperature. A heater is responsive to the electrical signal for generating an amount of heat proportional to the sensed temperature. An expandable structure is responsive to the heat generated by the heater for moving an output member. A linkage connects the output member with the valve for modulation of the position of the valve in response to variations in the sensed temperature.

In accordance with another specific aspect of the invention, a system is provided for control of a valve in response to temperature variations. A sensor detects temperature and controls a power supply which generates an electrical signal representative of the sensed temperature. An electrical motor has an output shaft rotatable in a first direction in response to the electrical signal. A spring biases the output shaft of the electrical motor for rotation in a second direction. Linkage connects the output shaft of the motor to modulate the position of the valve in response to variations in the sensed temperature.

In accordance with another specific aspect of the invention, a system controls the operation of a valve in response to temperature variations. A sensor detects temperature variations and controls circuitry which generates a pair of electrical signals which vary in accordance with temperature. A pair of electrical motors are connected to receive the electrical signals to rotate an output shaft in either of two directions. A linkage connects the output shaft to modulate the position of the valve in response to variations in the sensed temperature.

DESCRIPTION OF THE DRAWINGS

For a more complete understanding of the present invention and for further objects and advantages thereof, reference is now made to the following description taken in conjunction with the accompanying drawing, in which:

FIG. 1 is a diagrammatic illustration of one embodiment of the present control system in an air conditioning environment;

FIG. 2 is a perspective view of a sensing and indicating housing adapted for use with the present invention;

FIG. 3 is a schematic diagram of a temperature sensitive control circuit for operation of the actuators of the present invention;

FIG. 4 is a side view of a first embodiment of an actuator for use with the present invention;

FIG. 5 is a perspective view of a second embodiment of an actuator according to the present invention;

FIG. 6 is a side view, partially in cross section, of a third embodiment of an actuator;

FIG. 7 is an end view of the actuator shown in FIG. 6;

Referring to FIG. 1, there is illustrated an environmental control system for conditioning a zone 10. For instance, zone 10 may comprise a room or a larger area within a building. A supply of warm air is fed through a conduit 12, while a supply of cool air is supplied through a conduit 14. A movable damper blade 16 is moved to control the proportion of warm and cool air which is mixed and applied through a conduit 18 and a vent 20 into the zone 10. While the present control system may be used to control the flow of air and other fluids in a variety of different environmental control systems, the present invention has particular utility when used with such air conditioning systems as described in copending patent application Ser. No. 636,748, filed May 8, 1967, by William K. Hall, Jr. and in U.S. Pat. No. 3,376,916, issued to Gressett.

Figure 8:
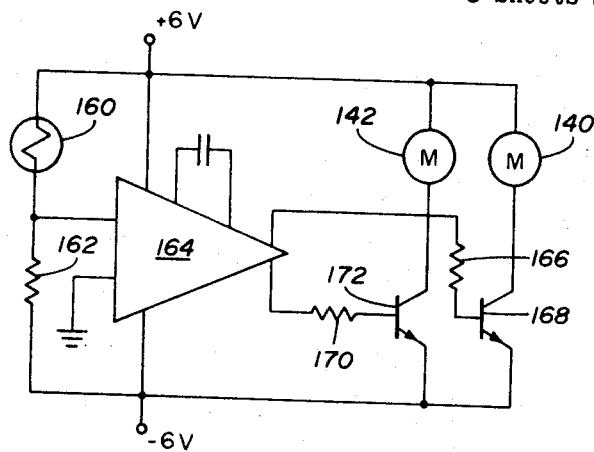
FIG. 8 is a schematic of a temperature sensitive circuit for control of the actuator shown in FIGS. 6 and 7.

A sensor within a wall mounted housing 22 senses the temperature of the air within the zone 10 and controls suitable circuitry within the housing 22 to supply an electrical signal via lead 24 to an actuator 26. As will be later described in greater detail, the electrical signal supplied via lead 24 may comprise an alternating current signal having portions thereof chopped in direct dependence upon the sensed temperature within the zone 10. Alternatively, the electrical signal fed via lead 24 may comprise voltages which vary nonlinearly with the temperature sensed within the zone 10.

The actuator 26 is operated in dependence upon the variable electrical signals applied thereto in order to move the damper blade 16 through a mechanical linkage 28. Actuator 26 is modulated between an infinite number of positions between its fully opened and fully closed positions in order to provide a smooth modulation of the damper blade 16. The temperature of the air fed to the zone 10 is then smoothly varied in response to temperature variations sensed within the zone. The temperature sensing system, in combination with the actuator 26, is provided with a relatively high damping factor so that the system responds relatively slowly to temperature variations in the zone 10. This prevents overreaction and hunting of the system to provide a very smooth and accurate control of the temperature within the zone 10, without the occurrence of radical temperature and humidity variations therein.

FIG. 2 illustrates in greater detail an embodiment of the housing 22 which may be mounted on the wall of the zone to be controlled by the present invention. A knob 30 on the housing may be manually operated to enable setting of the desired temperature within the zone. As will be later described, rotation of the knob 30 adjusts a resistance in the control circuitry of the invention. A plurality of slots 32 are provided in the sides of housing 22 in order to enable flow of air therethrough. A suitable temperature sensor located within the housing 22 is then able to accurately sense the ambient zone temperature. A window 34 within the housing 22 visually displays the present temperature within the zone by means of a conventional thermometer pointer.

FIG. 3 illustrates in schematic detail one embodiment of the power supply circuitry of the present invention. An alternating current signal is applied to the circuit via a power supply transformer 40. The actuator 26 which operates the mechanical linkage 28 is connected at one terminal to the secondary of the transformer 40. A capacitor 42 is connected between the other terminal of the actuator 26 and circuit ground. The terminal of the actuator 26 is also connected to an inductance 44, which in turn is connected at one terminal to series connected resistances 46 and 48. Resistor 48 may be varied to provide initial calibration to the system. A capacitor 50 is connected between a terminal of the resistance 48 and circuit ground.

Resistance 48 is also connected to a diac device 52 which in turn is connected to the trigger electrode of a triac device 54. The remaining electrodes of the triac device 54 are connected between the inductance 44 and circuit ground. Resistance 48 is also connected via lead 56 to a heat sensor 58, which may for instance comprise the GB41J1 Thermister manufactured and sold by the Fenwal Company. The temperature sensor 58 is connected to a variable resistance 60 which may be varied by rotation of the knob 30 shown in FIG. 2 in order to set the desired temperature into the present system. A capacitor 62 is connected between resistors 60 and circuit ground. The triac device 54 may comprise for instance the HT322 triac manufactured and sold by Hunt Electronics Company, while the diac device 52 may comprise the 2N4992 diac manufactured and sold by General Electric Company.

In operation of FIG. 3, the thermister 58 and the capacitor 50 form an R-C timing circuit which controls the operation of the diac 52. The timing constant of the R-C circuit will vary in accordance with variance of the resistance of the thermister 58, to thereby vary the time at which the diac 52 breaksover into conduction. The diac 52 controls the operation of the triac 54, and thus the conduction operation of the triac 54 is controlled in response to variation of the value of the resistance of the thermister 58. The inductance 44 operates as an R-F interference filter. In some instances, it may be desirable to place a full wave rectifier utilizing a Zener diode in the circuit at the connection of resistances 46 and 48 and circuit ground. The operation of the triac 54 thus chops off portions of the A-C signal fed to the actuator 26 in direct dependence upon the temperature sensed by the thermister 58. The resulting A-C signal fed to the actuator 26 modulates the operation of the actuator to thereby modulate the position of the linkage 28 which controls a damper or other valve in an environmental control system.

A first embodiment of an actuator according to the present invention is illustrated in FIG. 4 generally by numeral 70. The chopped A-C signal supplied by the circuit shown in FIG. 3 is fed via lead 72 to a switch unit 74. Power passed through the switch unit 74 is applied via lead 76 to a heating member 78. Heating member 78 comprises a number of turns of resistance wire which heat up proportional to the alternating current signals applied via lead 76. The resistance heating coils are wrapped around an expandable member 80 which includes a generally cylindrical metal body filled with an expandable material which tends to expand in response to heat. Such expandable devices are presently readily commercially available. An output shaft 82 extends from the expandable member 80 and moves between an extended and retracted position in direct dependence upon the amount of heat generated by the heater member 78. A housing 84 is connected to the shaft 82 and is adapted to slide along tracks 86 and 88 as shaft 82 moves. An adjustable screw 90 is positioned to abut against the housing 84 to prevent movement of the housing 84 past a preselected location.

An adjustable screw 92 is fixedly attached to the housing 84 for movement therewith. Screw 92 actuates a switch member 94 extending from switch unit 74 upon movement of the housing 84 past a predetermined point. Movement of the switch member 94 cuts off the application of current to the heater member 78 via lead 76 to prevent overheating of the device.

An extension member 100 is provided with a generally square cross section and is attached by a pin 102 to the horizontally extending member 104 of the housing 84. A spring 106 abuts against one side of the housing 84 and a rigid wall 108 to provide a continuous bias against the movement of the housing 84. The end of extension member 100 is rotatably journaled in a pin 109 in an eccentric manner in a cylindrical crank member 110. A shaft 112 is journaled through suitable bearings and extends for connection with suitable linkage for connection to a damper or other valve in an air conditioning system. A suitable actuator assembly including the heater, heat responsive expandable member and current limiting switch is manufactured and sold by the Dole Division of Eaton, Yale and Towne as a ZVS-1A upper assembly of a zone valve.

It will thus be appreciated, that as the alternating current fed to the actuator shown in FIG. 4 is modulated in response to the sensed temperature within the zone 10, the movement of the shaft 82 and the extension member 100 is proportional to the variations in the sensed temperature in the zone 10. The modulation of the damper or other valve by the actuator shown in FIG. 4 is thus directly proportional to variations in the sensed temperature and serves to accurately maintain a desired temperature within the sensed zone. The present system is provided with a relatively high damping factor so that radical changes in the position of the damper or other valve are not made, but such that a relatively gradual change in position of the damper is made.

FIG. 5 illustrates another embodiment of an actuator for use with the present invention. The actuator includes a nonreversible A-C electrical motor 120 which is adapted to be driven by the chopped A-C signals supplied by the circuit shown in FIG. 3. The output shaft of the motor 120 is connected to a gear 124 which meshes to drive a gear 122. A torsion spring 126 is wound about the gear 124 to provide continuous bias thereto. The gear 122 includes stepped portions which abut against the stop member 128 to limit the rotation thereof. A suitable actuator as shown in FIG. 5 is manufactured and sold under the tradename MOTORTROL series by the Erie Manufacturing Company.

In operation of the actuator, the output shaft on the motor 120 is provided with a torque proportional to the applied alternating current voltage input to the motor. The spring 126 provides a suitable bias at the output of the motor 120 to normally hold the motor output in an intermediate position at a predetermined alternating current input. Upon reduction of the input alternating current power to the motor 120 below the predetermined input, the spring 126 rotates the motor output shaft in one direction. When the alternating current input power rises above the prescribed value, the output shaft is rotated by the motor in the opposite direction. A suitable linkage fits within the cavity 130 of gear 122 for operation of a damper or other valve in an air conditioning system. The actuator shown in FIG. 5 thus presents an accurate modulating movement to the damper or other valve in response to the signals applied from the circuit shown in FIG. 3.

FIGS. 6 and 7 illustrate a third embodiment of an actuator for use with the present invention. The actuator comprises a pair of relatively high torque synchronous motors 140 and 142 which operate as a reversible synchronous motor system of conventional design. The output shaft 144 of the motor system may thus be rotated in either direction and is connected to a threaded shaft 146. A support member 148 is provided to enable the motor system to be attached to the side of an air conditioning duct or the like. A plug 150 is slidably mounted within a metal sleeve 152. Plug 150 preferably will be constructed from a plastic such as Delrin or the like. An end portion 154 of the plug 150 is threadedly connected about the shaft 146. As best shown in FIG. 7, the cross sections of the plug 150 and of the sleeve 152 are square. A fitting 156 is connected to the outer end of the plug 150 for attachment through a linkage to a damper or other valve. In operation of the device shown in FIGS. 6 and 7, the motor system is energized to rotate the shaft 146. Due to the threaded connection with plug 150, the plug 150 is slidably moved along sleeve 152 upon rotation of the shaft 146 to thereby position the damper or other valve. A suitable motor for use with the present invention is the motor disclosed in U.S. Pat. No. 3,363,536, issued to Dean, Jr. on Jan. 16, 1968.

Instead of operating the motors 140 and 142 as shown in FIG. 6 in an "on" or "off" manner according to the prior art, the present invention utilizes the circuit shown in FIG. 8 to provide modulating control to the motors 140 and 142. A temperature sensitive device 160 is located in a housing similar to that shown in FIG. 2. Bias voltage is supplied across a resistance 162 and the sensor 160. A common terminal of the sensor 160 and the resistor 162 is applied to the noninverting input of an operational amplifier 164. A suitable amplifier for use with the invention is the MC1520 amplifier manufactured and sold by Motorola Corporation. Amplifier 164 generates a differential pair of nonlinear output voltages in dependence upon variance of the temperature sensed by the sensing device 160. Upon increase of the sensed temperature a positive-going signal is applied via resistor 166 to the base of a transistor 168, while a negative-going signal is applied via resistor 170 to the base of a transistor 172. The collector of transistor 168 is connected to motor 140, while the transistor 172 is connected to motor 142.

Figure 9:
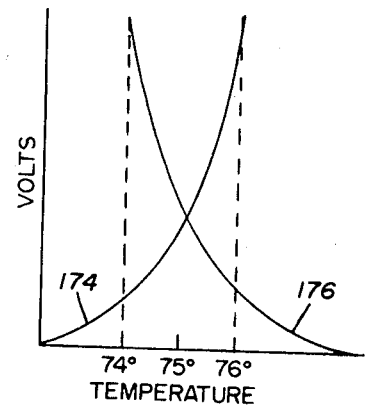
FIG. 9 is a graph illustrating the output voltages of the circuit shown in FIG. 8.

FIG. 9 illustrates in a diagrammatic manner the output signal characteristics of the circuit shown in FIG. 8. A first curve 174 diagrammatically illustrates the variance in voltage from transistor 168 for control of motor 140. Curve 176 illustrates the inverse variance of the voltage applied from transistor 172 which controls the operational motor 142. It may be seen that curves 174 and 176 overlap in an approximate 2° range, such that the motors 140 and 142 tend to "buck" one another in the desired temperature area. With the use of the circuit shown in FIG. 8 with the device of FIGS. 6 and 7, very smooth modulation of a damper or other valve in an air conditioning system is provided.

Figure 10:
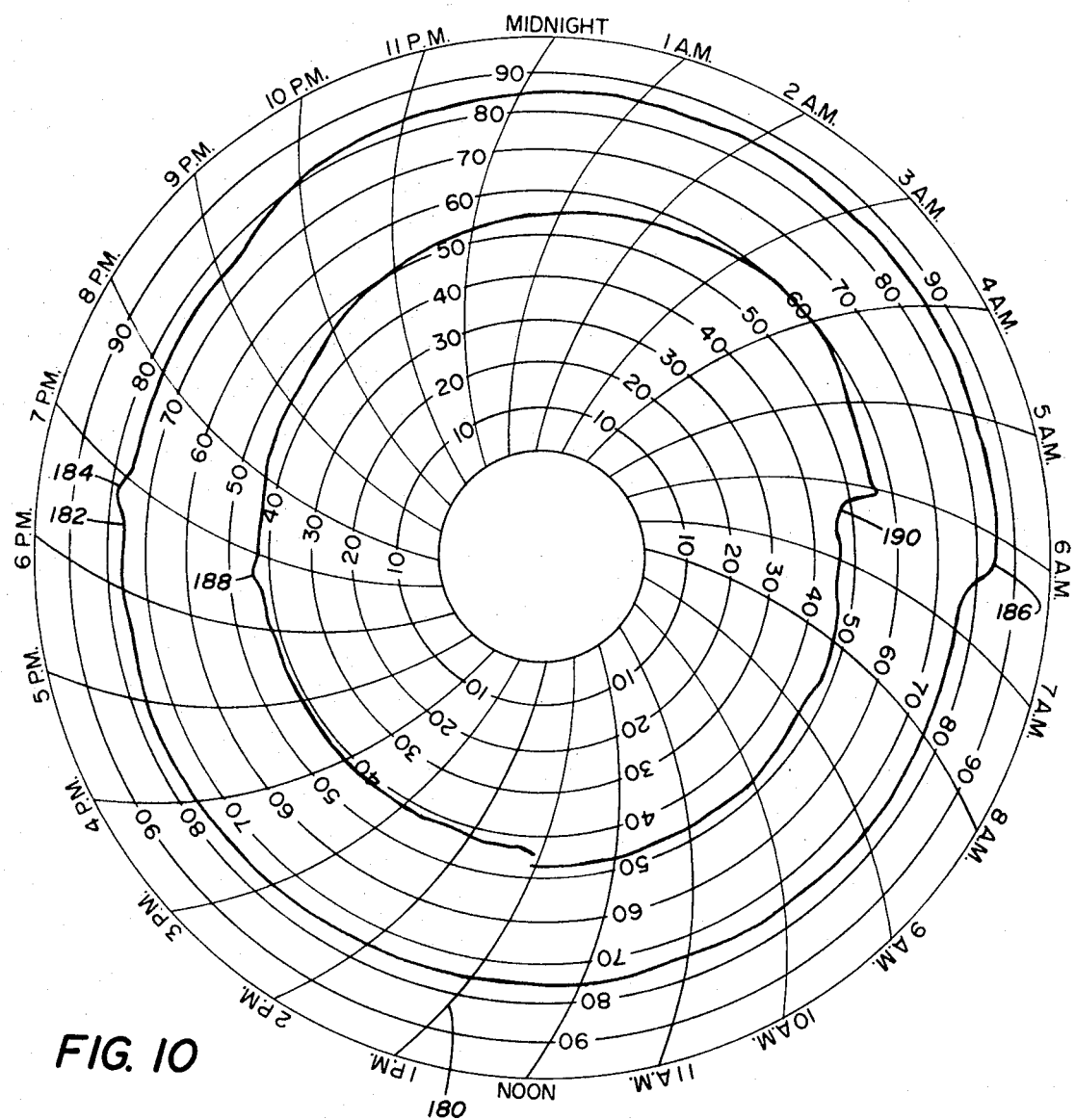
FIG. 10 is a graph illustrating variations in temperature and humidity in a zone controlled by the present system.

An example of such environmental control utilizing the present invention is illustrated in FIG. 10, which comprises a time and amplitude graph of the temperature and humidity in a zone utilizing the present invention to control air flow thereto. Recording operation with the graph was initiated at 1 p.m., as indicated at location 180, with a zone temperature of about 75°. This temperature was maintained in a constant manner by the present system until about 6:30 p.m., as indicated by location 182, when the air conditioning system of the building was shut down by an automatic time clock. It may be seen that the temperature then rose slightly to approximately 78° as indicated at location 184. This variation in temperature was sensed by the present control system and residual cool air was pulled from the building's system into the zone such that the temperature of the zone was brought down to approximately 75° for several more hours.

At slightly past 9 p.m., the residual cool air of the building was depleted, and the temperature in the zone bagan to rise. At approximately 6:15 a.m., as indicated by location 186, the air conditioning system was automatically turned on and the present system was able to very quickly and smoothly bring the temperature within the sensed zone back to 75° in a short time, without significant hunting or variation of the temperature therein.

A like effect upon shutting down of the system at about 6:30 p.m. may be seen at location 188 upon the humidity within the zone. Additionally, upon the energizing of the air conditioning system at about 6:15 a.m., as indicated at location 190, the present system was able to bring the humidity in the zone down to a stable value in a relative short period of time, without significant hunting or variation of the humidity within the room. It is noted that the smooth control provided by the present invention as shown in FIG. 10 would not be present with the conventional "on" or "off" systems, which provide a continuous variation of the zone temperature and humidity due to their inherent hunting operation.

While the present system has been described particularly in relation to control of a damper blade in an air conditioning system, it will be realized that the present system may be used to modulate other valves in environmental control systems, such as water flow valves and the like.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. In a system for control of a valve in response to temperature variations, the combination comprising:
   resistor means having an electrical resistance which is variable in dependence on temperature variations,
   timing circuitry including said resistor means for providing a variable time delay dependent upon said temperature variations,
   power supply means connected to said timing circuitry and including diac means connected to the trigger electrode of a triac device, said disc means operable in response to said timing circuitry for controlling the conduction of said triac,
   means for supplying an alternating current electrical signal across said triac wherein conduction of said triac chops portions of said electrical signal in dependence upon said temperature variations,
   a nonreversible electrical motor connected to receive said chopped electrical signal and having an output shaft rotatable in a first direction in response to said chopped electrical signal,
   spring means for biasing said output shaft for rotation in a second direction when said chopped electrical signal drops below a preselected value, and
   linkage means for connecting said output shaft to modulate the position of said valve in response to said temperature variations.

2. The combination of claim 1 wherein said timing circuitry further comprises a capacitor.

3. The combination of claim 1 and further comprising an inductance connected to provide an R-F filter.

* * * * *